United States Patent Office 3,849,567
Patented Nov. 19, 1974

1

3,849,567

USE OF THIADIAZOLE HYDRAZONES AS BACTERICIDES

Chester G. Lemanski, East Brunswick, N.J., assignor to Mobil Oil Corporation

No Drawing. Filed Apr. 27, 1970, Ser. No. 32,429
Int. Cl. A01n 9/12
U.S. Cl. 424—270 4 Claims

ABSTRACT OF THE DISCLOSURE

Certain 1,3,4-thiadiazol-2-yl hydrazones form a new class of bactericides. They are highly effective in the standard primary Penicillin Disc test against *Xanthomonas vesicatoria,* the causal organism of bacterial leaf spot of pepper.

CROSS-REFERENCE TO RELATED APPLICATIONS

None.

BACKGROUND OF THE INVENTION

Field of the Invention

This invention is directed to the novel use of certain 1,3,4-thiadiazol-2-yl hydrazones as bactericides. It is more particularly concerned with the use of 5-substituted 1,3,4-thiadiazol-2-yl hydrazones as bactericides.

Description of the Prior Art

In the recent past certain thiadiazol ureas have been disclosed as herbicides and fungicides. A compound for use in the present invention, acetone [5-mercapto-1,3,4-thiadiazol-2-yl] hydrazone, is known to the art (*Acta. Chem. Scan.*, 15, 1295 [1961]) but to my knowledge has not been disclosed as a bactericide.

SUMMARY OF THE INVENTION

This invention provides for use as bactericides compounds having the formula:

wherein $R_1$ is alkyl (e.g., $C_1$–$C_4$ or more), alkylthio (e.g., $C_1$–$C_4$ or more), mercapto, hydroxy, alkoxy (e.g., $C_1$–$C_4$), substituted phenoxy, substituted phenyl, substituted phenylthio, or haloalkyl (e.g., $C_1$–$C_4$), $R_2$ and $R_3$ form a carbocyclic ring (e.g., $C_3$–$C_6$) or heterocyclic ring (e.g., $C_4$–$C_6$), or are hydrogen, alkyl (e.g., $C_1$–$C_8$ or more), haloalkyl (e.g., $C_1$–$C_3$), substituted phenyl, alkoxy (e.g., $C_1$–$C_3$), alkylthio (e.g., $C_1$–$C_3$) or combinations thereof, and $R_4$ is hydrogen, alkyl (e.g., $C_1$–$C_3$), trichloromethylthio, or alkoxy; and bactericidal compositions comprising at least one such compound and a carrier therefor.

DESCRIPTION OF SPECIFIC EMBODIMENTS

As will be noted from the above formula, the compounds for use as bactericides in the present invention are 5-substituted 1,3,4-thiadiazol-2-yl hydrazones. Nonlimiting examples of the compounds disclosed for use as bactericides in this invention include:

acetone [5-mercapto-1,3,4-thiadiazol-2-yl] hydrazone;
2-butanone [5-mercapto-1,3,4-thiadiazol-2-yl] hydrazone;
2-hexanone [5-mercapto-1,3,4-thiadiazol-2-yl] hydrazone;
acetaldehyde [5-mercapto-1,3,4-thiadiazol-2-yl] hydrazone;
benzaldehyde [5-mercapto-1,3,4-thiadiazol-2-yl] hydrazone;
trichloroacetaldehyde [5-mercapto-1,3,4-thiadiazol-2-yl] hydrazone;

2 hexafluoroacetone [5-mercapto-1,3,4-thiadiazol-2-yl] hydrazone;
acetone [5-methyl-1,3,4-thiadiazol-2-yl] hydrazone;
2-hexanone [5-methyl-1,3,4-thiadiazol-2-yl] hydrazone;
benzaldehyde [5-methyl-1,3,4-thiadiazol-2-yl] hydrazone;
acetone [5-methylthio-1,3,4-thiadiazol-2-yl] hydrazone;
2-butanone [5-methylthio-1,3,4-thiadiazol-2-yl] hydrazone;
benzaldehyde [5-methylthio-1,3,4-thiadiazol-2-yl] hydrazone;
acetone [5-hydroxy-1,3,4-thiadiazol-2-yl] hydrazone;
benzaldehyde [5-hydroxy-1,3,4-thiadiazol-2-yl] hydrazone;
acetone [5-ethoxy-1,3,4-thiadiazol-2-yl] hydrazone;
2-butanone [5-methylphenyl-1,3,4-thiadiazol-2-yl] hydrazone;
acetone [5-phenoxy-1,3,4-thiadiazol-2-yl] hydrazone; and
acetone [5-chloromethyl-1,3,4-thiadiazol-2-yl] hydrazone.

The compounds of this invention are readily prepared by the general procedure:

An appropriate thiocarbohydrazone is reacted with carbon disulfide in the presence of a suitable reaction medium, e.g., pyridine. The precipitate formed is removed and the filtrate is evaporated to about half the original volume and added to water to give a crystalline product which may be further recrystallized from a suitable recrystallization medium, an example of which is ethanol.

EXAMPLE 1

Acetone [5-mercapto1,3,4-thiadiazol-2-yl] hydrazone

Monoacetone thiocarbohydrazone (4.5 g., 0.031 mole) and carbon disulfide (3.5 g., 0.047 mole) were refluxed in pyridine (40 ml.) for 6 hours. A pale yellow precipitate (1 g.) was removed and identified as the bis-pyridinium salt of 4-amino-3,5-dimercapto-1,2,4-triazole by its melting point and infrared spectrum. The filtrate was then evaporated to nearly one half of the original volume, and the residue was poured onto water (50 ml.). A crystalline product (1.9 g.) was obtained. It was recrystallized from ethanol as colorless rods with a melting point of 216–217° C. The obtained product provided the following values upon analysis by the following identification methods:

ELEMENTAL ANALYSIS

| | Percent | | |
|---|---|---|---|
| | C | H | N |
| Calculated ($C_5H_8N_4S_2$) | 31.90 | 4.28 | 29.76 |
| Found for example compound | 31.90 | 4.22 | 29.71 |

Mass Spectroscopy of Example Compound

M.W. 188, (P+2 for 2 sulfurations).

NMR of Example Compound

δ:1.24 (6H; singlet), 11.4 (1H, singlet).

EXAMPLE 2

2-Butanone [5-mercapto-1,3,4-thiadiazol-2-yl] hydrazone

Mono 2-butanone thiocarbohydrazone (10 g., .063 mole) and carbon disulfide (7.2 g., 0.095 mole) were refluxed in pyridine (40 ml.) for 6 hours. A pale yellow precipitate (1.5 g.) was removed and identified as the bis-pyridinium salt of 4-amino-3,5-dimercapto-1,2,4-triazole by its melting point and infrared spectrum. The filtrate was then evaporated to nearly one half of the original volume, and the residue was poured onto water (50 ml.). A crystalline product (8.6 g.) was obtained. It was recrystallized from ethanol as colorless rods with a decomposition point of 215–217° C. The obtained product provided the following values upon analysis by the following identification method:

NMR of Example Compound

δ:0.54 (3H; triplet), 1.24 (3H; singlet),
1.70 (2H, quartet), 10.1 (1H; singlet).

EXAMPLE 3

2-Hexanone [5-mercapto-1,3,4-thiadiazol-2-yl]hydrazone

Mono 2-hexanone thiocarbohydrazone (8.0 g., 0.043 mole) and carbon disulfide (5.0 g., 0.065 mole) were refluxed in pyridine (40 ml.) for 6 hours. A pale yellow precipitate (1.8 g.) was removed and identified as the bis-pyridinium salt of 4-amino-3,5-dimercapto-1,2,4-triaole by its melting point and infrared spectrum. The filtrate was then evaporated to nearly one half of the original volume, and the residue was poured onto water (50 ml.). A crystalline product (6.1 g.) was obtained. It was recrystallized from ethanol as colorless rods with a decomposition point of 208–210° C. The obtained product provided the following values upon analysis by the following identification method:

NMR of Example Compound

δ:0.24 (3H; triplet), 0.70 (5H; complex multiplet), 1.20 (3H; singlet), 1.54 (2H; triplet), 11.16 (1H singlet).

Compounds of the examples were subject to the following bactericide screening test. The results are set forth in the Table following the test description.

BACTERICIDE SCREENING METHOD

Penicillin Disc Test (Contact Method)

*Xanthomonas vesicatoria*, the causal organism of bacterial leaf spot of pepper, is cultured on Nutrient Agar in 20 x 150 mm. test tubes. The medium is prepared by dissolving 25 g. of Nutrient Agar in 1000 ml. of cold distilled water, heating to boiling the completely dissolved agar, and sterilizing in the autoclave for 15 minutes at 15 pounds pressure and 121° C. Ten ml. of the medium is poured into each test tube, allowed to solidify and then streaked with the bacterium from a pure culture. Cultures are optimum for use in the test after 7 days.

A 7-day old culture is washed from a test tube with sterile water and added to 500 ml. of Nutrient Agar when the medium reaches a temperature of 50° C. Twenty-five ml. of inoculated medium is added immediately to 90 mm. petri plates and is allowed to solidify. A 100 p.p.m. solution of the test compound is prepared by dissolving the compound in a suitable solvent and diluting with water to a 100 ml. volume. With sterile forceps, two sterile penicillin assay discs (12 mm. diameter) are dipped into each solution, tapped gently to remove excess solution, and placed on top of the medium surface. Each disc is pressed gently onto the medium to seat it firmly. Plates are covered and incubated at 26° C. for 5 days.

After 5 days, ratings are made by measuring the diameter of the zone of inhibition surrounding the disc according to the following key:

| Diameter of zone of growth inhibition, mm. | Percent effectiveness |
|---|---|
| 0 | 0 |
| 0–6 | 20 |
| 9 | 30 |
| 12 | 40 |
| 15 | 50 |
| 18 | 60 |
| 21 | 70 |
| 24 | 80 |
| 27 | 90 |
| 30 or more [1] | 100 |

[1] Streptomycin sulfate, the standard, gives this rating after 7 days at 100 p.p.m.

TABLE

Bactericide activity against *Xanthomonas vesicatoria*

| | Compound concentration, p.p.m. | Percent effectiveness after 5 days |
|---|---|---|
| Compound of example: | | |
| 1 | 10 | 60 |
| | 50 | 100 |
| | 100 | 100 |
| 2 | 100 | 50 |
| 3 | 100 | 80 |
| Streptomycin sulfate as standard | 10 | 0 |
| | 100 | 100 |

[1] After 7 days.

From the data in this table, it will be noted that the 1,3,4-thiadiazol-2-yl hydrazones of this invention have a high bactericide activity. The compound of Example 1, acetone [5-mercapto-1,3,4-thiadiazol-2-yl] hydrazone, shows effectiveness at the low concentration of 10 p.p.m. whereas the standard streptomycin sulfate is not effective at that concentration. The compound of Example 1 also shows 100% effectiveness at 50 and 100 p.p.m. concentrations. The compounds of Examples 2 and 3 also show effectiveness at 100 p.p.m. concentration.

The compounds of this invention exhibit considerable bactericidal activity and are disclosed for use in various ways to achieve contact control of bacteria. They can be applied per se, as solids or in vaporized form, but are preferably applied as the toxic components in bactericidal compositions of the compound and a carrier. The compositions can be applied as dusts, as liquid sprays or as gas-propelled sprays and can contain, in addition to a carrier, additives such as emulsifying agents, wetting agents, binding agents, gases compressed to the liquid state, odorants, stabilizers and the like. A wide variety of liquid and solid carriers can be used in the bactericidal compositions. Non-limiting examples of liquid carriers include water; organic solvents such as alcohols, ketones, amides, and esters; mineral oils such as kerosene, light oils, and medium oils; and vegetable oils such as cottonseed oil. Non-limiting examples of solid carriers include talc, bentonite, diatomaceous earth, pyrophyllite, fullers earth, gypsum, flours derived from cottonseeds and nut shells, and various natural and synthetic clays having a pH not exceeding about 9.5.

The amount of the compounds of this invention utilized in bactericidal compositions will vary rather widely. It depends to some extent upon the type of composition in which the material is being used, the nature of the condition to be controlled, and the method of application (i.e., spraying, dusting, etc.). In the ultimate bactericidal composition, as applied in the field, bactericide concentrations as low as 0.0001 weight percent of the total composition can be used. In general, compositions, as applied, containing about 0.05 weight percent bactericide in either liquid or solid carrier give excellent results. In some cases, however, stronger dosages up to about 10 weight percent may be required.

In practice, bactericidal compositions are usually prepared in the form of concentrates, which are diluted in the field to the concentration desired for application. For example, the concentrate can be a wettable powder containing large amounts of a compound of this invention, a carrier (e.g., attapulgite or other clay), and wetting and dispersing agents. Such a powder can be diluted, prior to application, by dispersing it in water to obtain a sprayable suspension containing the concentration of bactericides desired for application. Other concentrates can be solutions that can be later diluted, e.g., with kerosene. Thus, it is within the contemplation of this invention to provide bactericidal compositions containing up to about 80 percent, by weight of the composition, of a bactericidal compound of this invention. Accordingly, depending upon whether it is ready for application or it is in concentrated form, the contemplated bactericidal compositions contain between about 0.0001 percent and about 80 percent, by weight of the composition, of a bactericidal compound of this invention, and a carrier, liquid or solid, as defined hereinbefore.

Although the present invention has been described with preferred embodiments, it is to be understood that modifications and variations may be resorted to, without departing from the spirit and scope of the invention, as those skilled in the art will readily understand.

What is claimed is:

1. A method for combatting bacteria which comprises applying to said bacteria a bactericidally effective amount of a compound having the formula:

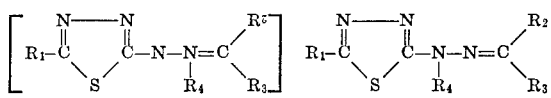

wherein $R_1$ is mercapto, $R_2$ is a $C_1$–$C_4$ alkyl, $R_3$ is a $C_1$–$C_4$ alkyl, and $R_4$ is hydrogen.

2. A method for combatting bacteria, as defined in Claim 1, wherein the bactericidally effective compound has the formula:

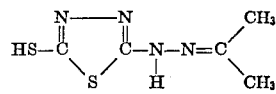

3. A method for combatting bacteria, as defined in Claim 1, wherein the bactericidally effective compound has the formula:

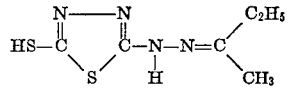

4. A method for combatting bacteria, as defined in Claim 1, wherein the bactericidally effective compound has the formula:

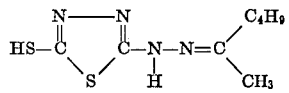

References Cited

Chemical Abstracts 57: 12472c (1962).

JEROME D. GOLDBERG, Primary Examiner